United States Patent [19]
Parslow, Jr.

[11] Patent Number: 5,749,383
[45] Date of Patent: May 12, 1998

[54] NON-LINEAR CHAIN BELT TYPE CONVEYOR

[75] Inventor: Harold W. Parslow, Jr., Washington, Mich.

[73] Assignee: Grapar Corporation, Warren, Mich.

[21] Appl. No.: 284,258

[22] Filed: Aug. 2, 1994

[51] Int. Cl.⁶ ............................................. B08B 13/00
[52] U.S. Cl. .................... 134/56 R; 134/58 R; 134/131; 198/341; 198/464.2
[58] Field of Search ......................... 198/340, 502.4, 198/850, 853, 341, 464.2, 810.01, 831, 572; 134/56 R, 72, 131, 133, 48, 80, 81, 32, 67, 68, 56 D; 271/199, 176; 414/222, 221, 223, 224, 225, 226

[56] References Cited

U.S. PATENT DOCUMENTS

| | | | |
|---|---|---|---|
| 1,046,853 | 12/1912 | Proal, Jr. | |
| 1,204,428 | 11/1916 | Grandfield | |
| 1,712,126 | 5/1929 | Taylor | |
| 2,558,818 | 7/1951 | Campbell | 134/48 |
| 2,633,970 | 4/1953 | Robinson | |
| 3,022,791 | 2/1962 | Larson | |
| 3,122,235 | 2/1964 | Meeker et al. | 134/48 |
| 3,370,720 | 2/1968 | Schickle | 134/133 |
| 3,384,097 | 5/1968 | Meeker et al. | 134/48 X |
| 3,690,443 | 9/1972 | Snyder | 198/831 |
| 3,788,455 | 1/1974 | Dieckmann, Jr. | 198/831 |
| 3,834,408 | 9/1974 | Thalacker | 198/340 |
| 3,930,573 | 1/1976 | Wymann | 198/810.01 |
| 3,942,545 | 3/1976 | Flynn | 134/80 |
| 3,985,226 | 10/1976 | Noren | 134/133 |
| 4,399,991 | 8/1983 | Everall, Jr. et al. | 271/199 |
| 4,676,361 | 6/1987 | Neisler | 198/464.2 |
| 4,788,786 | 12/1988 | Suter | 134/56 R |
| 5,042,648 | 8/1991 | Garvey | 198/853 |
| 5,084,829 | 1/1992 | Kato | 198/340 |
| 5,086,794 | 2/1992 | Guerinat et al. | 134/56 R |
| 5,127,515 | 7/1992 | Damkjaer | 198/853 |
| 5,201,407 | 4/1993 | Proske | 198/853 |
| 5,222,855 | 6/1993 | Bernard, II et al. | 198/34 |
| 5,311,980 | 5/1994 | Munkner et al. | 198/850 |
| 5,357,648 | 10/1994 | Noestheden | 134/72 |
| 5,451,130 | 9/1995 | Kempe | 198/396.2 |
| 5,464,088 | 11/1995 | Koerbe | 198/464.2 |

OTHER PUBLICATIONS

Almco, Inc., 902 E. Main Street, Albert Lea, MN. 56007 Industrial Parts Washers and Dryers/Sales (Brochure).

*Primary Examiner*—Frankie L. Stinson
*Attorney, Agent, or Firm*—Young & Basile, P.C.

[57] ABSTRACT

A compact chain belt-type conveyor for conveying articles along a non-linear path through an industrial washer and drier. The chain belt-type conveyor provides an article sensing means wherein the sensing means is responsive to the presence of an article at a predetermined station along a predetermined non-linear path. A signalling means, responsive to the sensing means, signals a driving means to stop the conveyor when an article is present at the predetermined station for a predetermined amount of time and starts when an article is absent from the predetermined station. The signalling means ensures that each article will only be placed through one washing and drying cycle since a washed article must be removed from the predetermined station of the conveyor before the driving means will continue to drive the conveyor. An article holding means may be provided to secure the articles along the conveyor and provide proper orientation of the articles through the washing and drying process. A chain mesh construction conveyor may also be utilized to support and carry articles without the use of the article holding means. In the preferred embodiment, the non-linear shape of the conveyor is substantially u-shaped so that articles can be loaded and unloaded to and from the conveyor by either a single operator or a single automated mechanism. The present invention also provides for a programmable robotic arm that responds to the presence of an article at the predetermined station.

35 Claims, 3 Drawing Sheets

NON-LINEAR CHAIN BELT TYPE CONVEYOR

FIELD OF THE INVENTION

The present invention relates to chain belt type conveyors utilized to convey articles in a non-linear path, and more particularly, to a u-shaped chain belt type conveyor that conveys articles through an industrial washer and drier and provides an automatic sensing means that is responsive to the presence of articles at a predetermined station along the conveyed path in order to increase the efficiency of the washing and drying process by insuring that each article realizes only one washing and drying cycle.

BACKGROUND OF THE INVENTION

In general, industrial washers and dryers are utilized to wash and dry a wide array of articles throughout industry. In manufacturing and assembly operations, it is often desirable to rid an article of cutting oils, grease, dirt and loose machined pieces by placing the articles through an industrial washer and dryer prior to subsequent machining, assembling and/or gauging operations. Typically, each industrial washer and dryer design requires a method of carrying or conveying the articles through the washer and dryer. Many different conveyors have been designed and utilized, and many disadvantages have been discovered pertaining to different conveyor designs.

Often, conveyors are utilized to carry articles along a linear path wherein the washing and drying process occurs between the ends of the linear path. The use of linear path conveyors for industrial washer and dryers are typically inefficient since they require a large amount of space as well as requiring a separate operator or mechanism for loading and unloading the conveyor at each end of the linear conveyor.

Many conveyors utilized in conjunction with industrial washer and dryers are continuous, wherein articles are continually conveyed through the washing and drying process until the articles are removed from the conveyor. Typically, continuous conveyors are over and under type conveyors wherein the conveyor conveys articles upright along an upper conveyor path and then rotates 180° to create a lower return path beneath the upper conveyor path. Such over and under conveyors may be utilized to convey articles in both linear and non-linear paths. Other continuous conveyors travel in a continuous path along a common plane such as a circular or oval path.

Such continuous conveyors do pose problems when manually loaded and/or unloaded. First, the articles on the conveyor must be continually loaded and unloaded, or the articles may continuously cycle through the washing and drying process unnecessarily. Secondly, if the articles are allowed to continually cycle through the washing and drying process, there is no way to identify the articles or the number of times the articles have been cycled. Thus, articles become unidentifiable and placed through unnecessary washing and drying cycles which create inefficiencies that are undesirable in industry.

Conveyors utilized in conjunction with industrial washers and dryers must also be designed to withstand the corrosive environments of washing solutions, excessive heat, water, etc. Thus, such a conveyor must be designed and manufactured from materials that will not rust, corrode or degrade in any manner that would hinder their ability to perform.

SUMMARY OF THE INVENTION

The present invention solves the above-mentioned shortcomings by providing a compact chain belt type conveyor that provides a conveying means for conveying articles along a predetermined non-linear path through a conventional industrial washing and drying means. The non-linear characteristic of the conveyor allows the ends of the conveyor to be substantially close to one another so that a single operator or mechanism can load and unload articles to and from the conveyor. A sensing means senses the presence of an article at a predetermined station along the predetermined non-linear path. A signalling means, responsive to the sensing means, sends a signal to the conveyor means to stop when an article is present at the predetermined station and start when an article is absent from the predetermined station. The sensing means ensures that each article will be put through only one washing and drying cycle.

In one embodiment, the articles are fixtured on an article holding means which is connected to and carried by the conveying means. The sensing means requires a cycled article to be removed from the predetermined station before the conveying means will advance and provide the necessary space for an uncycled article to be placed on the conveyor. In a second embodiment, the articles are not fixtured on the conveyor belt, and the signalling means utilizes a dwell time wherein the sensing means must be actuated for a predetermined amount of time before the signalling means sends a signal to the conveying means to stop. This allows the articles to continuously slide off the conveyor belt at the end of the non-linear path until the articles back up onto the conveyor belt thus actuating the sensing means and surpassing the dwell time of the signalling means. The signalling means sends a signal to the conveying means to stop the conveyor belt until the backed up articles are removed.

The conveying means utilizes a metallic frame and a non-metallic conveyor bed supported by the frame in order that the conveyor can withstand the corrosive environment of the industrial washing and drying means. The conveyor bed has at least one side wall defining an upper guide slot corresponding to an upper non-linear conveyor path and a lower guide slot corresponding to a lower non-linear return path. A plurality of non-corrosive chain links, having complementary surfaces for cooperatively engaging one another, are pivotally coupled to form a conveyor chain belt. The conveyor chain belt is slidably supported and guided by the conveyor bed along the predetermined nonlinear path. The pivotal coupling and cooperative engagement of the chain links, as well as the non-corrosive materials in which the chain links and the conveyor bed are fabricated, allow the chain belt to bend horizontally and vertically, maintain a low level of friction between moving parts and avoid corrosion amongst moving parts.

To this end, the objects of the present invention are to provide a new and improved chain belt type conveyor that conveys an article along a predetermined non-linear path in order to increase efficiency by reducing the amount of space required by the conveyor as well as reducing the number of operators and automated article handling mechanisms needed to load and unload the conveyor; to provide a new and improved chain belt type conveyor that prohibits unnecessary washing and drying of articles by ensuring each article is cycled only once; and to provide a new and improved chain belt type conveyor that is fabricated from material that can withstand the corrosive environment of an industrial washer and dryer.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
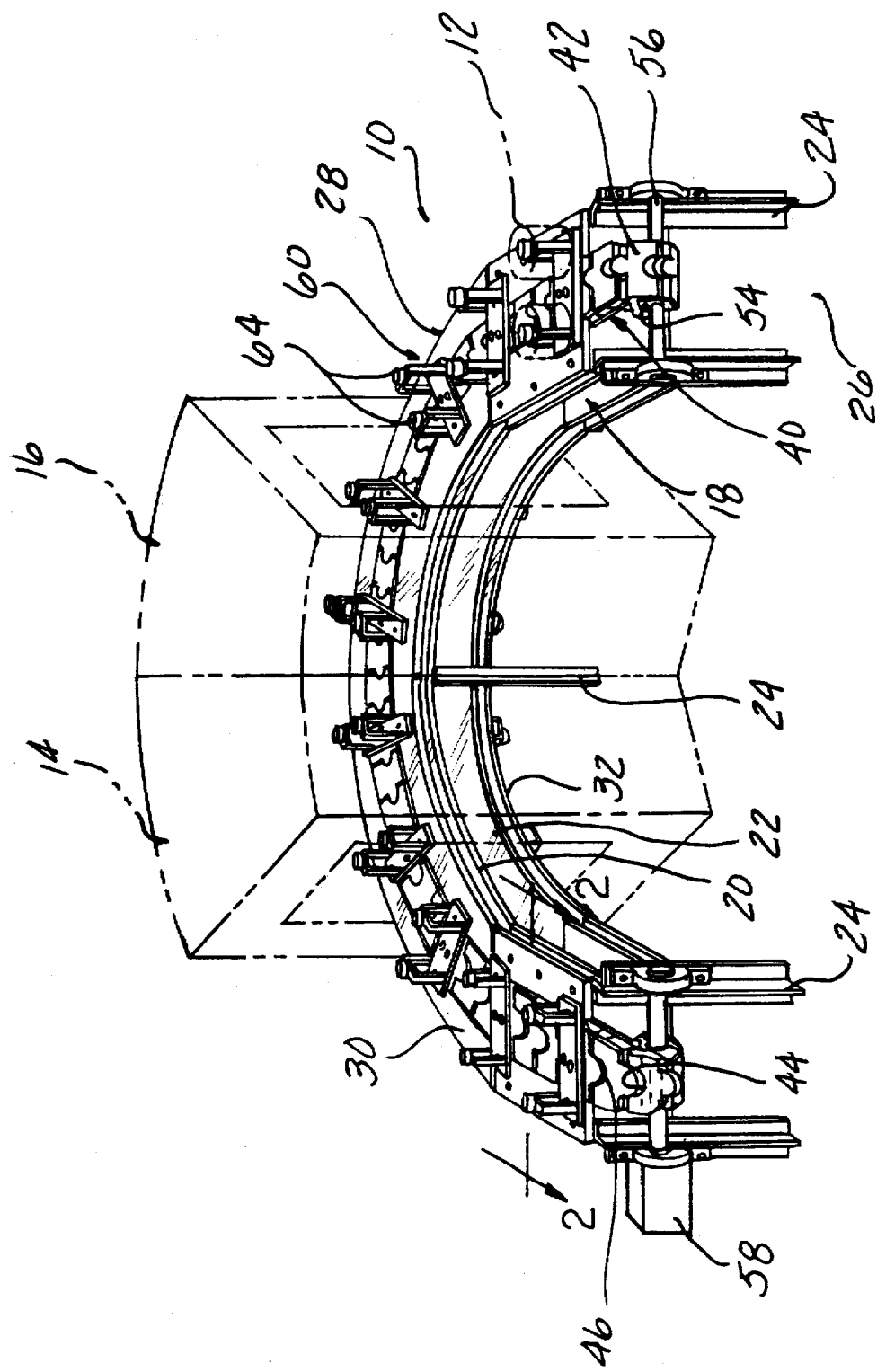
FIG. 1 is a perspective view of the chain belt type conveyor made according to the present invention and shown being utilized in conjunction with an industrial washer and dryer.
Figure 2:
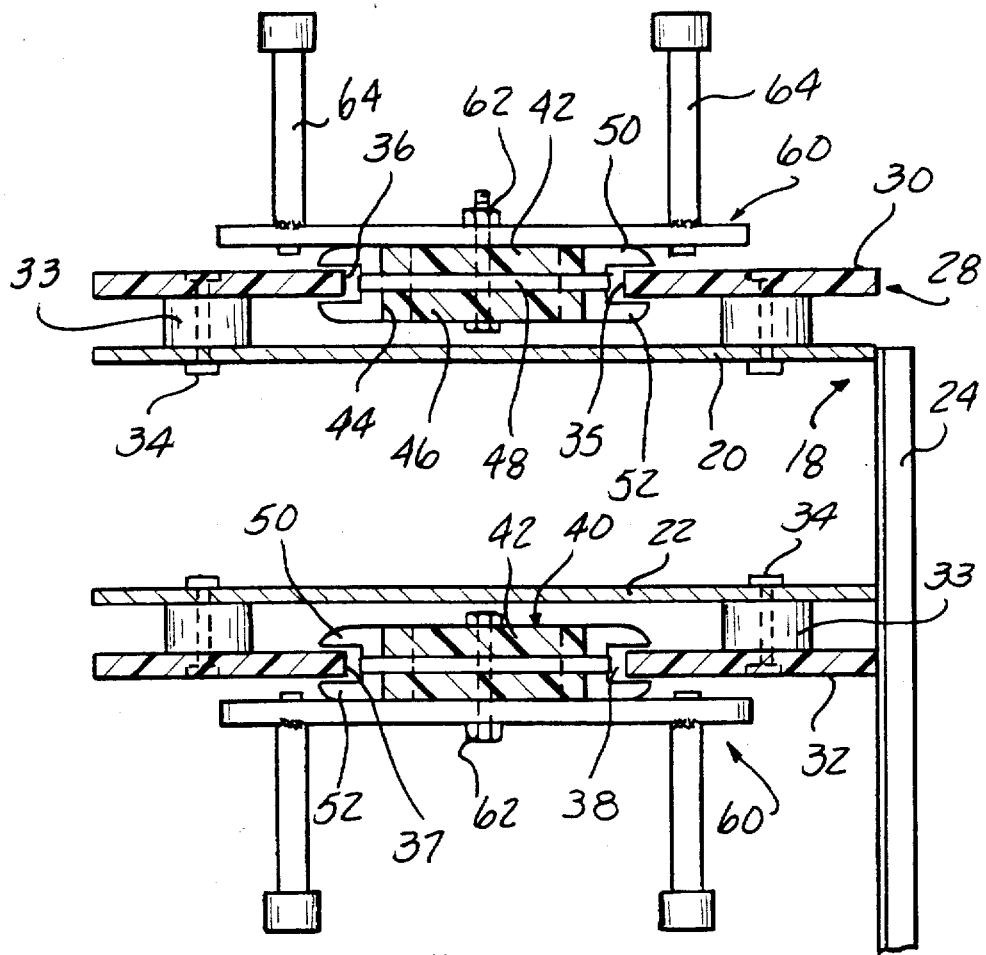
FIG. 2 is a cross section view taken in the direction of arrows 2—2 of FIG. 1 and showing the conveyor chain belt slidably supported and captively guided by the upper and lower guide slots of the conveyor bed.

FIG. 1 shows a chain belt type conveyor 10 made according to the preferred embodiment of the present invention. The chain belt type conveyor 10 provides a conveying means for conveying at least one article or work piece 12 along a predetermined non-linear path through a conventional industrial washer 14 and dryer 16. An article holding means secures the articles 12 in proper orientation for cleaning the articles 12 in the industrial washer 14 and dryer 16. A steel frame 18 having a non-linear configuration, preferably a u-shaped configuration, supports the conveying means. The steel frame 18 has an upper support 20 and a lower support 22 that are substantially u-shaped and are substantially parallel to one another wherein the lower support 22 is spaced beneath the upper support 20, as seen in FIGS. 1 and 2. A plurality of support members 24 are connected to the u-shaped supports 20, 22 on the outside and inside circumferences of the upper and lower u-shaped supports 20, 22. The support members 24 are connected to a floor or foundation 26 to provide a rigid frame structure for the conveyor 10.

The frame 18 supports a conveyor bed 28 that is fabricated from a conventional polymeric material such as plastic. The conveyor bed 28 has an upper and a lower u-shaped plate 30, 32, respectively, that lie directly above and below and substantially parallel to the u-shaped upper and lower supports 20, 22 of the frame 18. The upper and lower plates 30, 32 of the conveyor bed 28 are supported by and spaced from the steel supports 20, 22 of the frame 18 by a plurality of cylindrical spacers 33. The plates 30, 32 of the conveyor bed 28 and the steel supports 20, 22 of the frame 18 are connected to opposite ends of the cylindrical spacers 33 by conventional fasteners 34. The conventional fasteners 34 extend through the upper and lower plates 30, 32 of the conveyor bed 28, the cylindrical spacers 33 and the upper and lower supports 20, 22 of the frame 18 to connect and secure the conveyor bed 28 to the frame 18. Both the upper and lower plates 30, 32 of the conveyor bed 28 have side walls 35, 37 that define guide slots 36, 38, respectively, that extend through the central portion of the plates 30, 32 and around the entire length of the conveyor bed 28.

In order to convey the articles 12 along the predetermined non-linear path, the conveying means provides a continuous conveyor chain belt 40 by linking a plurality of similar unitarily constructed chain links 42 end to end. Each chain link 42 has a substantially hemispherical recess 44 at one end of the chain link 42 and a substantially hemispherical male member 46 extending from the other end of the chain link 42. The chain links 42 form the continuous chain belt 40 by cooperatively engaging the substantially hemispherical recess 44 of each chain link 42 with the substantially hemispherical male member 46 of each adjacent chain link 42. A pivot pin 48 extends through apertures (not shown) provided in the male member 46 of each chain link 42 and the portion of each chain link 42 defining the recess 44 in order to cooperatively engage the chain links 42. The apertures must be slightly oversized relative to the pivot pin 48 in order to allow the chain links 42 to bend horizontally and vertically. The complementary surfaces 44, 46 of the chain links 42 have clearances between adjacent surfaces to ensure that the adjacent chain links 42 will not interfere with each other when bending. Each of the chain links 42 is fabricated from a conventional polymeric material such as plastic in order that a low level of friction is maintained between adjacent chain links 42 and the conveyor bed 28. The low level of friction and the flexibility of the plastic provides a wear resistant quality in the conveyor chain belt 36 that can withstand the bending of the non-linear, over and under conveyor path. The plastic chain links 42 are also resistant to the corrosive environment of the industrial washer 14 and dryer 16, i.e. washing solutions, water, heat, etc.

To guide the chain belt 40 along the predetermined non-linear path of the conveyor bed 28, each of the chain links 42 provide a pair of opposing, substantially parallel flanges 50, 52 extending from opposite sides of each chain link 42. Each chain link 42 has a slightly narrower width than the guide slots 36, 38 of the conveyor bed 28 so that the chain links 42 may travel within the guide slots 36, 38 while the flanges 50, 52 of the chain links 42 are slidably supported and captively guided by the plates 30, 32 of the conveyor bed 28 by having the flanges 50, 52 extend over and under the portion of the conveyor bed plates 30, 32 that define the guide slots 36, 38. The captive engagement and large rigid construction of the chain links 42 allows the conveyor chain belt 10 to carry and support larger and heavier articles. As noted above, the plastic plates 30, 32 of the conveyor bed 28 provide a low friction sliding engagement with the plastic material of the chain belt 40 to allow for proper sliding and bending of the chain belt 40. Also, the plastic plates 30, 32 of the conveyor bed 28 are resistant to the corrosive environment of the industrial washer 14 and dryer 16 thus ensuring the performance of the conveyor 10 will not degrade due to corrosion.

The conveyor chain belt 40 is supported and driven at the ends of the predetermined non-linear paths by a pair of similar sprockets 54 that are mounted on lateral axes 56 supported by the frame 18. The sprocket 54 engages the chain belt 40 between the complementary surfaces 44, 46 of the chain links 42 and guides the chain belt 40 when rotating between the upper non-linear conveyor path and the lower non-linear return path of the conveyor bed 28. The driving means is provided by a motor 58 that is coupled with at least one of the sprockets 54 in order to power the rotation of the sprockets 54 and drive the conveyor chain belt 40 along the continuous, predetermined, non-linear path.

In order to secure the articles 12 when conveyed through the industrial washer 14 and dryer 16, the article holding means utilize pallets 60 that are secured directly to the conveyor chain belt 40 by extending conventional fasteners 62 through the pallets 60 and through the chain links 42. The pallets 60 are spaced a predetermined number of chain links 42 from one another in order that the full circumference of the articles 12 may be washed and dried properly. Each pallet 60 provides holders 64 for two articles 12 in order to increase the efficiency of the washing and drying process. It should be noted that the present invention is not limited to the particular pallets 60 described, but rather, any work holding means may be utilized to secure the articles 12 on the conveyor 10 when being conveyed through the washing and drying process.

To prevent the articles 12 from being cycled more than once through the industrial washer 14 and dryer 16, an article sensing means is utilized to sense the presence of an article 12 when it reaches a predetermined station along the upper conveyor path. A signalling means, responsive to the actuation of the article sensing means, provides a signal to the driving means that the article 12 is present at the predetermined station of the upper conveyor path, and, in response, the driving means stops the conveyor chain belt 40. Typically, the predetermined station would be located at the end of the upper conveyor path or a location on the upper conveyor path subsequent to the industrial washer 14 and dryer 16, but the present invention is not limited to these locations.

In the preferred embodiment, each pallet 60 has a conventional pressure sensor (not shown) that indicates whether an article 12 is present on the pallet 60. An additional signal means is provided to signal that a pallet 60 has reached the predetermined station along the upper conveyor path. When both signals correspond to indicate that a pallet 60 with an article 12 is at the predetermined station along the upper conveyor path, the driving means stops the conveyor chain belt 40. In another embodiment, a conventional proximity switch 65 may be utilized as a sensing means to simply indicate that an article 12 is present at the predetermined station of the upper conveyor path. When the proximity switch 65 sends a signal to the signalling means, such as a conventional programmable controller 67, indicating that the article 12 is at the predetermined station along the conveyor path, the signalling means sends a signal to the driving means to stop the conveyor 10.

The motor 58, which drives the sprockets 54, is responsive to the signal generated by the signalling means. When the signal indicates that an article 12 is present at the predetermined station along the upper conveyor path, the motor 58 stops, and the conveyor chain belt 40 is halted. Thus, the conveyor chain belt 40 waits for the article 12 to be removed from the predetermined station so that the article 12 is not unnecessarily put through an additional washing and drying cycle. Once the article 12 is removed from the predetermined station along the upper conveyor path, a signal is sent to the motor 58 indicating that an article 12 is not present at the predetermined station. The motor 58 responds by driving the sprockets 54 and the conveyor chain belt 40 thereby advancing the conveyor chain belt 40 until the signal provides the motor 58 with an indication that an article 12 has reached the predetermined station.

Figure 3:
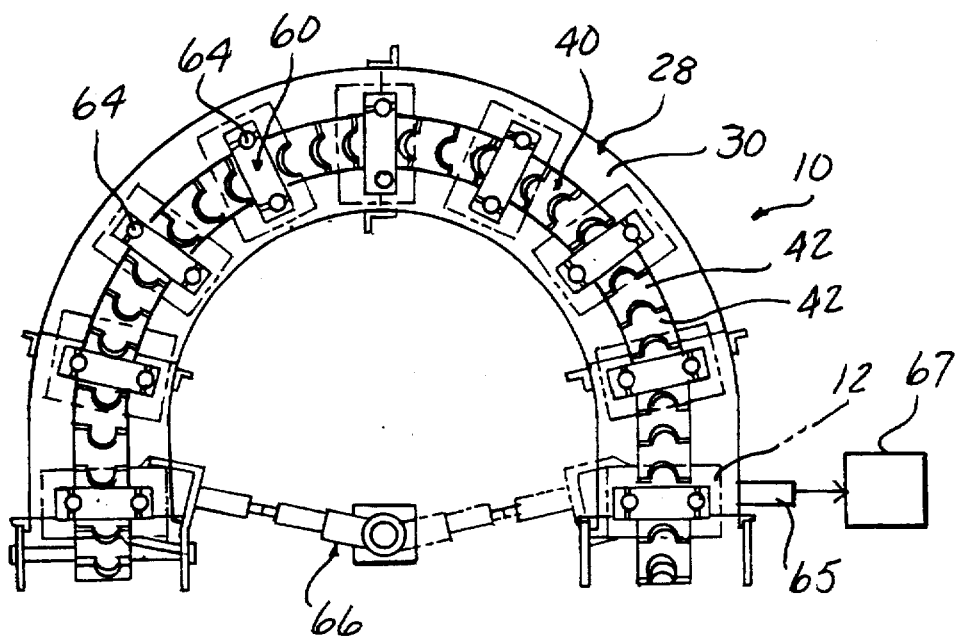
FIG. 3 is a top view of the chain belt type conveyor showing the substantially u-shaped configuration of the upper and lower conveyor paths and showing a programmable robotic arm loading and unloading articles to and from an article holding means on the conveyor in response to a signalling means signalling the presence and absence of an article at the end of said upper conveyor path.

In order to automatically unload the articles 12 from the end of the upper conveyor path, a programmable robotic arm 66 may be utilized to respond to the signals generated by the signalling means, as seen in FIG. 3. When the programmable robotic arm 66 receives a signal from the signalling means indicating that an article 12 is at the end of the upper conveyor path, the robotic arm 66 responds by removing the article 12 from the pallet 60 at the predetermined station and placing the article 12 in a bin or subsequent conveyor (not shown). After the programmable robotic arm 66 unloads an article 12 from the predetermined station, the motor 58 selectively indexes the conveyor chain belt 40 so that an empty pallet 60 is present at the beginning of the upper conveyor path.

The programmable robotic arm 66 may also be utilized to load unwashed articles 12 onto the beginning of the upper conveyor path by swinging over to the beginning of the conveyor 10 after the programmable robotic arm 66 unloads a washed article 12 from the predetermined station along the upper conveyor path. The programmable robotic arm 66 may pick up an unwashed article 12 from a bin or additional conveyor (not shown) and load the unwashed article 12 onto an empty pallet 60 at the beginning of the upper conveyor path. The programmable robotic arm 66 swings over to the predetermined station along the upper conveyor path, and the process continually repeats itself. Although the present invention lends itself towards automatically loading and unloading the conveyor 10, the u-shaped design of the conveyor 10 does allow a single operator (not shown) to manually load and unload the conveyor 10 in an efficient manner.

Figure 5:
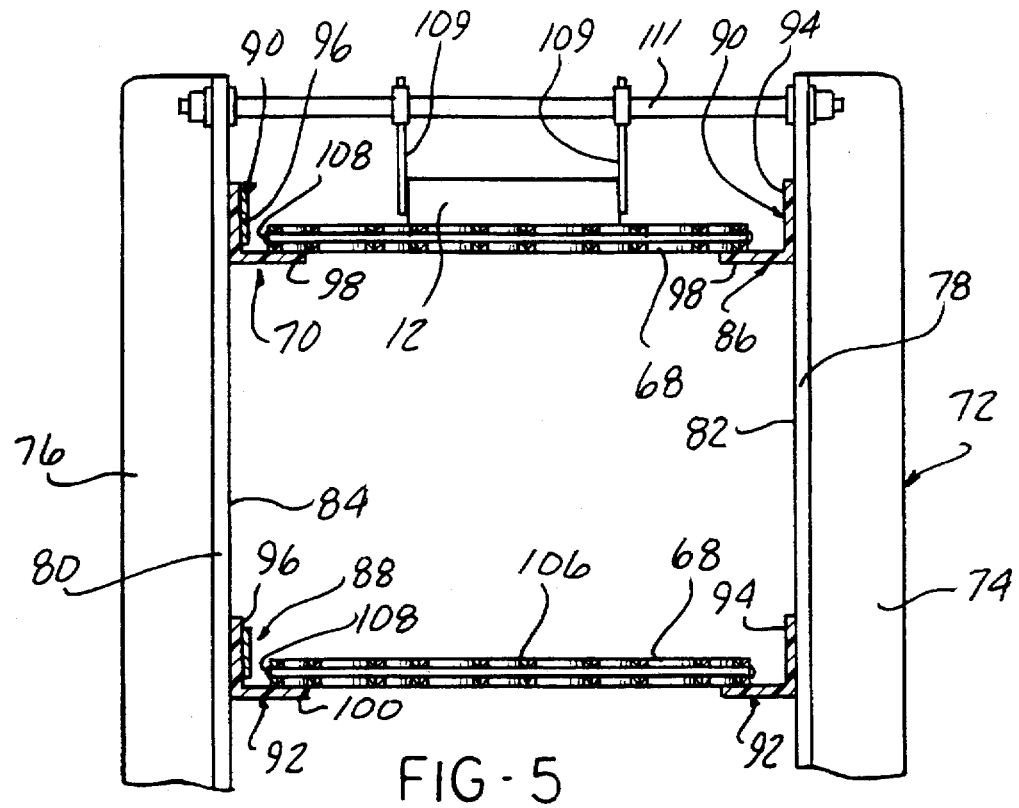
FIG. 5 is a cross section view taken in the direction of arrows 5—5 of FIG. 4 showing the second embodiment of the conveyor belt slidably supported by the conveyor.
Figure 4:
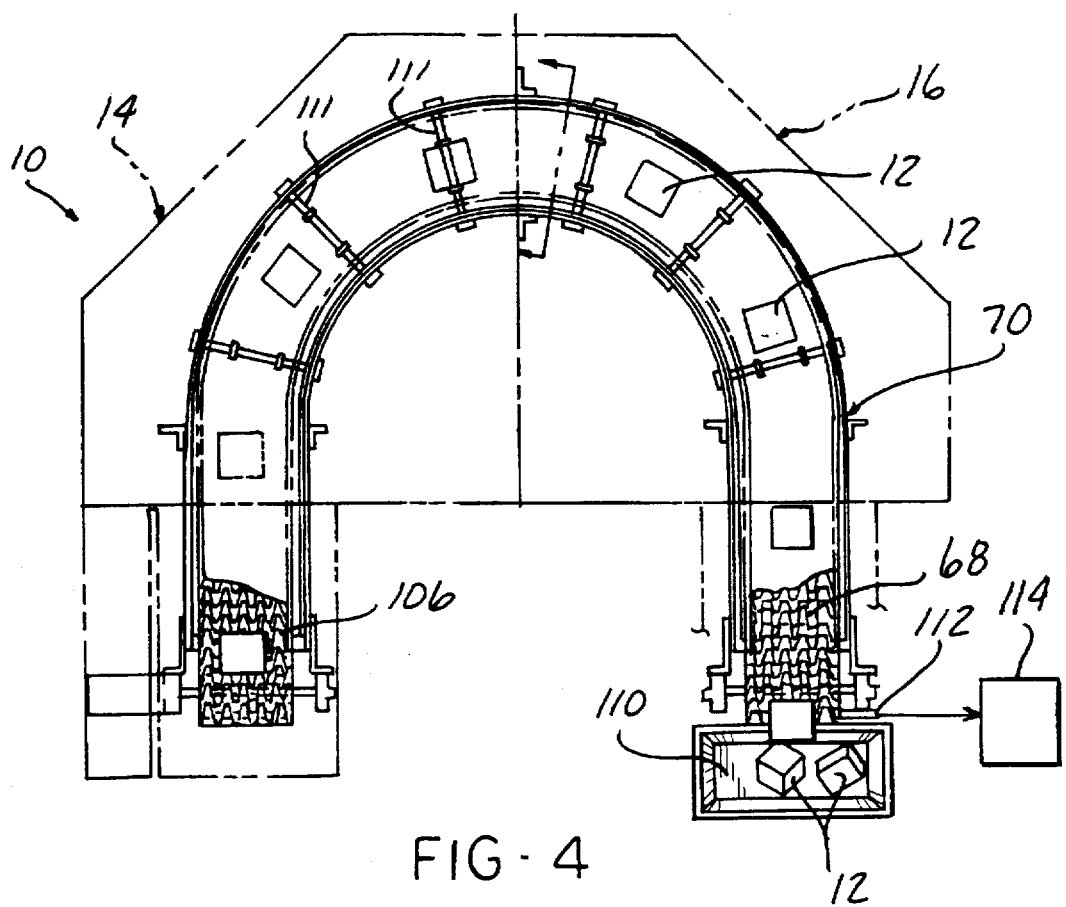
FIG. 4 is a top view of a second embodiment of the chain belt type conveyor showing articles supported and carried directly by the conveyor belt and automatically unloaded off the conveyor belt into an article back-up area.

When smaller, lightweight articles 12 are being conveyed by the chain belt conveyor 10, it may be desirable to utilize a different chain belt conveyor structure. In a second embodiment, a galvanized steel conveyor chain belt 68 is provided for conveying articles 12 in a non-linear path without the use of an article holding means, as seen in FIGS. 4–5. A conveyor bed 70, similar to the conveyor bed 28 previously described, slidably supports and guides the galvanized steel conveyor chain belt 68 along a predetermined continuous non-linear conveyor path, similar to that previously described. The galvanized steel conveyor chain belt 68 carries and supports the articles 12 through the industrial washer 14 and drier 16.

In order to slidably support the galvanized steel conveyor chain belt 68, a steel frame 72 is provided for supporting the conveyor bed 70 of the chain belt conveyor 10. The frame 72 utilizes substantially vertical pairs of opposing support members 74, 76 that are connected to the floor 26. The support members 74, 76 of the frame 72 have a substantially L-shaped cross-section wherein one of the legs 78 of the L-shaped cross-section supporting members 74 is substantially parallel and opposed to one of the legs 80 of the other support member 76. The conveyor bed 70 is connected to the inside opposing surfaces 82, 84, respectfully, of the legs 78, 80 wherein the conveyor bed 70 continually extends between the support members 76, 78 of the frame 72 to form a substantially U-shaped structure.

The conveyor bed 70 has both an upper plate 86 and a lower plate 88 wherein the lower plate 88 is substantially parallel to and beneath the upper plate 86. The upper and lower plate 86, 88 of the conveyor bed 70 each has a pair of substantially L-shaped cross-section guide rails 90, 92, respectfully, wherein each one of the guide rails 90, 92 is connected to the inside surface 82, 84 of the support members 74, 76 such that the inside surfaces 82, 84 of the support members 74, 76 are substantially parallel to a vertical portion or side wall 94, 96 of the guide rails 90, 92. The vertical portion or side walls of the guide rails 90, 92 of the conveyor bed guide the galvanized steel conveyor chain belt 68 along the non-linear conveyor path. A horizontal portion 98, 100 of the guide rails 90, 92 of the upper and lower plate 86, 88 extend inward toward one another. A space is provided between the horizontal portions of the guide rails 90, 92 of the upper and lower plate 86, 88 for allowing fluids and loose particles (not shown) to fall through the galvanized steel conveyor belt 68 and conveyor bed 10.

The guide rails 90, 92 of the upper and lower plates 86, 88 may be fabricated from a conventional plastic, as previously described in the preferred embodiment, or may provide a plastic wear surface layered onto the inside horizontal and vertical portions 98, 100, 102, 104 of the conveyor bed 78 which slidably support and guide the galvanized steel conveyor belt 68. In order to convey and carry the articles 12 along the predetermined non-linear conveyor path, the galvanized steel conveyor chain belt 68 is slidably supported along the top surface of the horizontal portion 102, 104 of the upper and lower plates 86, 88 of the conveyor bed 70 and is guided by the vertical portions or side walls 98, 100 of the upper and lower plate 86, 88 of the conveyor bed 70.

The galvanized steel conveyor chain belt 68 utilizes a mesh construction wherein each link has a continual S-shaped configuration wherein the S-shaped chain links 106 have complimentary surfaces so as to slidably engage one another. Each of the chain links 106 has slotted apertures (not shown) extending therethrough, wherein pins 108 extend through the slotted apertures to slidably and pivotally connect the complimentary chain links 106 to one another to form the mesh chain construction. The sliding and pivoting features of the chain mesh construction allow for the vertical and horizontal bending and turning of the conveyor chain belt 68.

The tight mesh chain belt construction 68 is commonly utilized for smaller conveyed articles 12 so that the articles 12 may be conveyed and carried on the surface of the mesh chain conveyor belt 68. Guide rods 109 extending downward from horizontal support rods 111 may be utilized to guide the articles 12 along the curved or non-linear portions of the galvanized steel conveyor chain belt 68. Thus, the articles 12 may automatically unload from the conveyer belt 68 by sliding off the conveyor belt 68 at the end of the upper conveyor path into a backup storage bin 110, as seen in FIG. 4.

The sensing means provides a sensor 112 at the predetermined station, preferably the end of the upper conveyor path, and the signalling means sends a signal in response to the actuation of the sensor 112. In this embodiment, the signalling means, such as a conventional programmable controller 114, does not send a signal to the driving means until the sensor 112 is actuated for a predetermined amount of time. This allows articles to pass by the sensor 112 and slide off the conveyor belt 68 into the backup storage bin 110 without having to stop the conveyor belt 68. If the parts are not unloaded from the storage bin 110, the articles will back-up onto the conveyor belt 68 and actuate the sensor 112. Once the sensor 112 is actuated for a predetermined amount of time, the signal means responds by sending a signal to the driving means to stop driving the conveyor chain belt 68. The same motor 58, as previously described, may be utilized for the driving means. Thus, the articles 12 must be removed from the storage bin 110 in order for the conveyor chain belt 68 to continue to convey articles 12. Any number of article removing means may be utilized to remove the backed-up articles 12, such as manual labor, a programmable robotic arm, an additional conveyor, etc.

It should be noted that the present invention is not limited to the conveyor chain belt structure specified in the above embodiments, but rather, any conveyor chain belt structure may be utilized which allows for the bending and turning of the conveyor chain belt structure while conveying and carrying an article so that the sensing means may indicate the presence of an article at a predetermined station along a predetermined non-linear path. One such conveyor chain belt structure may comprise a plurality of rollers (not shown) wherein said articles 12 may be conveyed by the rotation of said rollers along a non-linear conveyor path.

It should be noted that the present invention is not limited to industrial washers 14 and dryers 16, but rather, the chain belt type conveyor 10 may be utilized in any application wherein it is undesirable to have the conveyed article 12 continually cycled on the conveyor 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A conveyor comprising:
   a continuous conveyor chain belt supporting and moving at least one article along a substantially horizontal, predetermined non-linear path;
   means for indiscriminately sensing the presence of said article at an unloading station downstream of said predetermined non-linear path, and said conveyor chain belt being responsive to said sensing means so that said conveyor chain belt stops when said article is present at said unloading station and starts when said article is absent from said unloading stations means for signaling the presence of said article at said unloading station in response to said indiscriminate sensing means, wherein said indiscriminate sensing means senses the presence of said article at said unloading station for a predetermined amount of time before said signal means signals the presence of said article at said unloading station; and
   means for driving said conveyor chain belt, and said driving means responsive to said signaling means by driving said conveyor chain belt when said signal means signals the absence of said article from said unloading station and by not driving said conveyor chain belt when said signal means signals the presence of said article at said unloading station.

2. The conveyor stated in claim 1, including means for removing said article from said unloading station in response to said signal means signaling that said article is present at said unloading station.

3. The conveyor stated in claim 2, wherein said removing means comprises a programmable robotic arm.

4. The conveyor stated in claim 1 including means for holding said article wherein said article holding means is fixedly connected to and carried by said conveyor chain belt.

5. The conveyor stated in claim 1, including means for washing said article when said article is conveyed along said non-linear path by said conveyor chain belt.

6. The conveyor stated in claim 5, including means for drying said article when said article is conveyed along said non-linear path by said conveyor chain belt.

7. The conveyor stated in claim 1, wherein said non-linear path is substantially U-shaped.

8. A conveyor comprising:
   a frame;
   a conveyor bed supported by said frame, and said conveyor bed having at least one side wall for defining a guide slot corresponding to a predetermined non-linear path;

a continuous conveyor chain belt supporting and moving at least one article along a substantially horizontal, predetermined non-linear path, said conveyor chain belt having a plurality of similar chain links having a hemispherical male member and a female recess wherein said male member and said female recess of adjacently aligned chain links cooperatively engage one another, said chain links slidably supported by said conveyor bed, and said conveyor chain belt guided by said guide slot along said predetermined non-linear paths;

means for indiscriminately sensing the presence of said article at an unloading station downstream of said predetermined non-linear path, and said conveyor chain belt being responsive to said sensing means so that said conveyor chain belt stops when said article is present at said unloading station and starts when said article is absent from said unloading station; and a sprocket supported on lateral axes by said frame at the ends of said non-linear path, and said sprocket rotating in a substantially vertical plane and cooperatively and directly engaging said chain links of said conveyor chain belt.

9. The conveyor stated in claim 8, including means for coupling said chain links to one another for allowing said conveyor chain belt to bend horizontally and vertically.

10. The conveyor stated in claim 9, wherein said means for coupling comprises:

a pivot pin extending through said complementary surfaces of adjacent said chain links.

11. The conveyor stated in claim 8, including means for powering movement of said conveyor chain belt along said predetermined non-linear path.

12. The conveyor stated in claim 11, wherein said powering movement means comprises a motor coupled to said sprocket for rotating said sprocket and driving said conveyor chain belt along said predetermined non-linear path.

13. A conveyor comprising:

a frame;

a conveyor bed supported by said frame, and said conveyor bed having at least one side wall defining an upper guide slot corresponding to an upper non-linear conveyor path and a lower guide slot beneath said upper guide slot corresponding to a lower non-linear return path for forming a predetermined, continuous non-linear path;

a sprocket supported on lateral axes by said frame at the ends of said upper and lower non-linear paths and said sprocket rotating in a substantially vertical plane;

a conveyor chain belt having a plurality of similar, unitarily constructed chain links having complementary surfaces for cooperatively engaging one another, and said conveyor chain belt being slidably supported by said conveyor bed and being guided by said upper guide slot and said lower guide slot along said predetermined, continuous non-linear path, and said unitarily constructed chain links of said conveyor chain belt cooperatively and directly engaging said sprockets; and means for indiscriminately sensing the presence of said article at an unloading station downstream of said non-linear path, and said conveyor chain belt responsive to said indiscriminate sensing means so that said conveyor chain belt stops when said article is present at said unloading station of said upper non-linear conveyor path and starts when said article is absent from said unloading station of said upper non-linear conveyor path.

14. The conveyor stated in claim 13 further comprising:

means for signaling the presence of said article at said unloading station in response to said indiscriminate sensing means;

means for driving said conveyor chain belt, and said driving means responsive to said signaling means by driving said conveyor chain belt when said signaling means signals the absence of said article from said unloading station and by not driving said conveyor chain belt when said signaling means signals the presence of said article at said unloading station.

15. The conveyor stated in claim 13, wherein said indiscriminate sensing means senses the presence of said article at said unloading station for a predetermined amount of time before said signal means signals the presence of said article at said unloading station.

16. The conveyor stated in claim 15, further comprising means for removing said article from said unloading station in response to said signaling means signaling that said article is present at said unloading station.

17. The conveyor stated in claim 13, including means for washing said article when said article is conveyed along said upper non-linear conveyor path.

18. The conveyor stated in claim 17, including means for drying said article when said article is conveyed along said upper non-linear conveyor path subsequent to said washing means.

19. The conveyor stated in claim 13, wherein said upper and lower non-linear paths are substantially U-shaped.

20. The conveyor stated in claim 13, including means for coupling said chain links to one another for allowing said conveyor chain belt to bend horizontally and vertically.

21. The conveyor stated in claim 20, wherein said means for coupling comprises:

a pivot pin extending through said complementary surfaces of adjacent said chain links.

22. The conveyor stated in claim 13, including means for powering movement of said conveyor chain belt along said predetermined, continuous non-linear path.

23. The conveyor stated in claim 13, wherein said powering movement means comprises a motor coupled to said sprocket for rotating said sprocket and driving said conveyor chain belt along said predetermined, continuous non-linear path.

24. The conveyor stated in claim 13, further comprising means for holding at least one article wherein said article holding means is fixedly connected to and carried by said conveyor chain belt.

25. The conveyor stated in claim 24, including means for removing said article from said article holding means in response to said signaling means indicating that said article is present at said unloading station.

26. The conveyor stated in claim 25, wherein said means for removing said article comprises a programmable robotic arm.

27. A conveyor comprising:

a frame;

a conveyor bed supported by said frame, and said conveyor bed having a pair of side walls defining an upper guide slot corresponding to an upper non-linear conveyor path and a lower guide slot, beneath said upper guide slot, corresponding to a lower non-linear return path wherein said upper non-linear conveyor path and said lower non-linear return path combine to form a predetermined, continuous non-linear path;

a sprocket supported on lateral axes by said frame at the ends of said upper and lower non-linear paths;

a conveyor chain belt having a plurality of similar, unitarily constructed chain links having complementary surfaces for cooperatively engaging one another, and said conveyor chain belt slidably supported by said conveyor bed and said upper and lower guide slots for guiding said conveyor chain belt along said predetermined, continuous non-linear path, and said chain links coupled to one another through said complementary surfaces so that said conveyor chain belt can bend horizontally and vertically along said predetermined, continuous non-linear path, and said conveyor chain belt cooperatively and directly engaging said sprocket;

means for indiscriminately sensing the presence of said article at an unloading station downstream of said upper non-linear conveyor path;

means for signaling the presence and absence of said article at said unloading station in response to said indiscriminate sensing means; and a motor coupled to said sprocket for rotating said sprocket and driving said conveyor chain belt along said predetermined, continuous non-linear path in response to said signaling means so that said motor stops said conveyor chain belt when said signaling means provides a signal that said article is present at said unloading station and starts said conveyor chain belt when said signaling means provides a signal that said article is absent from said unloading station.

28. The conveyor stated in claim 27, wherein said upper non-linear conveyor path and said lower non-linear return path are substantially parallel and u-shaped.

29. The conveyor stated in claim 27, further comprising means for holding at least one article wherein said article holding means is fixedly connected to and carried by said conveyor chain belt.

30. The conveyor stated in claim 29, including means for removing said article from said article holding means in response to said signaling means signaling that said article is present at said unloading station; and means for moving a second article onto said article holding means in response to said article removing means removing said article from said article holding means at said unloading station of said upper non-linear conveyor path.

31. The conveyor stated in claim 30, wherein said means for removing said article and said means for moving said second article comprises a programmable robotic arm.

32. The conveyor stated in claim 27, wherein said indiscriminate sensing means senses the presence of said article at said unloading station for a predetermined amount of time before said signal means signals the presence of said article at said unloading station.

33. The conveyor stated in claim 32, further comprising means for removing said article from said unloading station in response to said signaling means signaling that said article is present at said unloading station.

34. The conveyor stated in claim 27, wherein said unloading station is located at the end of said upper non-linear conveyor path.

35. The conveyor stated in claim 27, further comprising:

means for washing said article when said article is conveyed along said upper non-linear conveyor path by said conveyor chain belt; and means for drying said article when said article is conveyed along said upper non-linear conveyor path by said conveyor chain belt subsequent to said washing means.

* * * * *